I. KITSEE.
TELEGRAPH CONVERTER.
APPLICATION FILED DEC. 4, 1908. RENEWED JUNE 8, 1911.
1,051,599.
Patented Jan. 28, 1913.
2 SHEETS—SHEET 1.
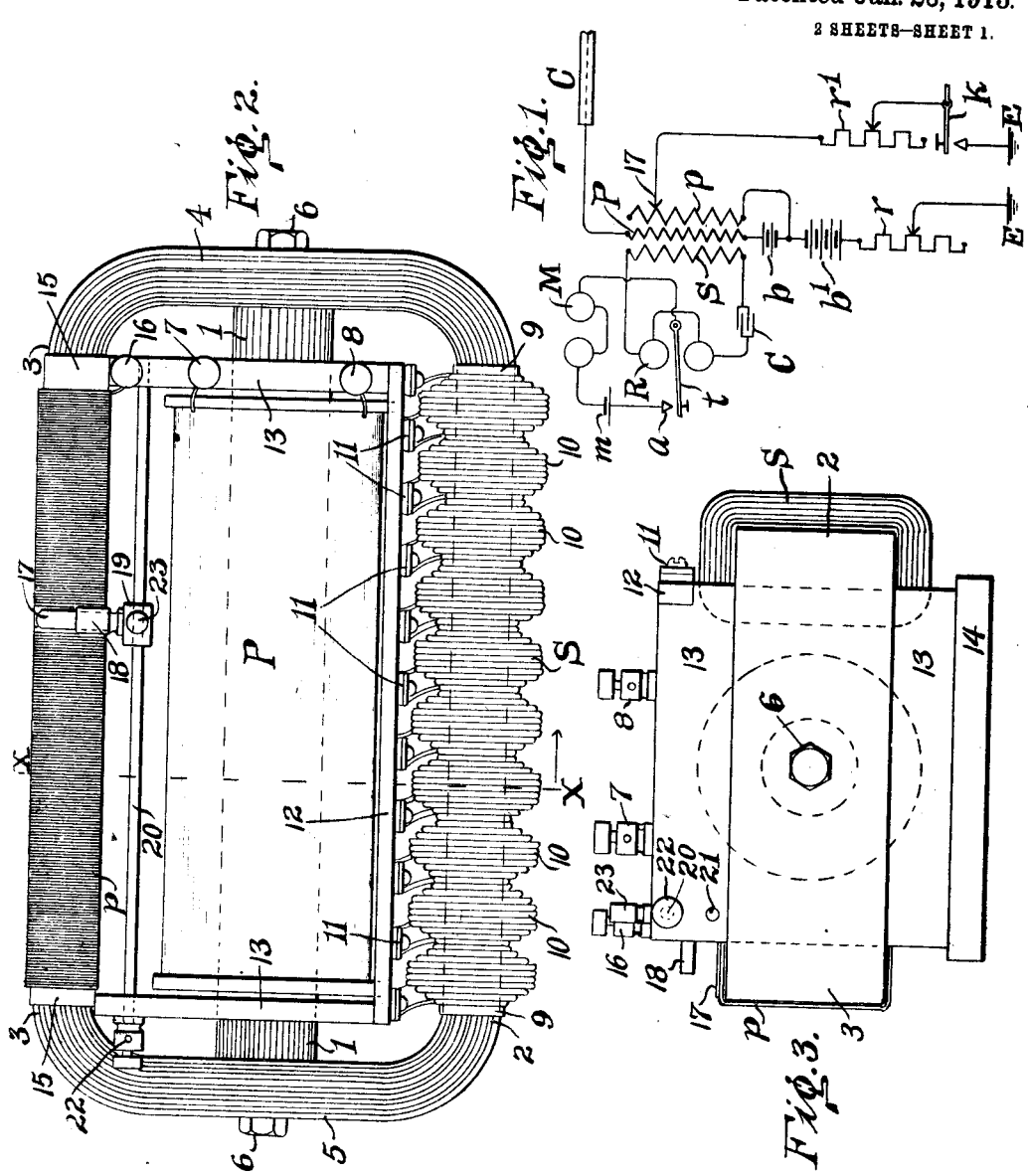

I. KITSEE.
TELEGRAPH CONVERTER.
APPLICATION FILED DEC. 4, 1908. RENEWED JUNE 8, 1911.
1,051,599.
Patented Jan. 28, 1913.
2 SHEETS—SHEET 2.
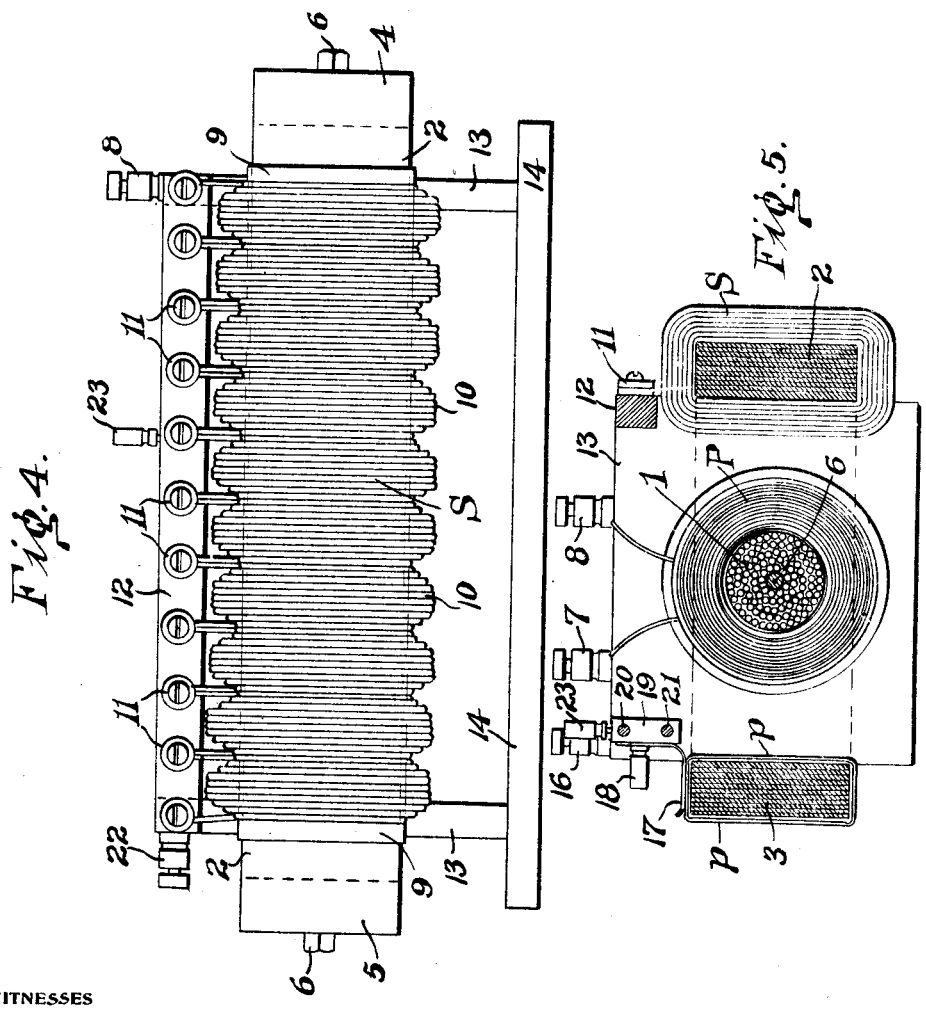

UNITED STATES PATENT OFFICE.

ISIDOR KITSEE, OF PHILADELPHIA, PENNSYLVANIA, ASSIGNOR OF ONE-HALF TO WILLIAM J. LATTA, OF PHILADELPHIA, PENNSYLVANIA.

TELEGRAPH-CONVERTER.

1,051,599.   Specification of Letters Patent.   Patented Jan. 28, 1913.

Application filed December 4, 1908, Serial No. 466,015. Renewed June 8, 1911. Serial No. 632,023.

*To all whom it may concern:*

Be it known that I, ISIDOR KITSEE, a citizen of the United States, residing in the city of Philadelphia, county of Philadelphia, and State of Pennsylvania, have invented a new and useful Telegraph-Converter, of which the following is a specification.

My invention relates to electric telegraphy and more particularly to telegraphy over long lines or circuits, such as long land lines, submarine, subterranean, or aerial cables, or, in fact, any circuit or conductor, especially when having great condenser or capacity effect.

My invention resides in a telegraphic converter or transformer having the features hereinafter described and claimed, in combination with circuit arrangements, such, for example, as may be employed in duplex telegraphy over lines having great condenser or capacity effect.

For an illustration of one of the forms my invention may take, reference is to be had to the accompanying drawing, in which:

Figure 1 is a diagrammatic view showing cable sending and receiving apparatus involving a telegraphic converter or transformer. Fig. 2 is a plan view of the converter or transformer. Fig. 3 is an end elevation of the same. Fig. 4 is a side elevation of the same. Fig. 5 is a cross sectional view, some parts in elevation, taken on the line X—X, of Fig. 2.

Referring to Fig. 1, C represents a submarine cable, or other line or cable having great condenser or capacity effect. Between it and the earth E are serially connected the primary P of the transformer or converter, the batteries or sources of energy $b$ and $b'$ and the adjustable resistance $r$. From a point between the sources $b$ and $b'$ there is a connection to one terminal of a second converter or transformer winding $p$ which may be considered a second primary winding. The number of turns in this primary is adjustable and from the other terminal there is a connection through the adjustable resistance $r'$ through the operator key $k$, when closed, to earth E. S is a secondary winding of the converter or transformer and in series with it are connected the condenser C and the winding of a polarized relay R, or other relay or signal translating instrument, whose armature or tongue $t$ and contact $a$ control the circuit including the sounder or other recorder or other translating instrument M and the source of energy or battery $m$. As explained in a co-pending application filed by me, this arrangement of circuits is for duplex cable telegraphy. The operator manipulates his key $k$ and in so doing causes impulses of alternate polarity to be impressed upon the line or cable C. But the effect upon the circuit of the secondary S of any impulses transmitted to the line or cable is rendered zero or negligible by the second primary $p$ which is in inductive relation with the secondary S and so disposed and connected as to cause no effect upon the receiving instrument of impulses transmitted from the same station. Impulses received over the cable from a distant station pass through the primary P and by inductive effect upon the secondary S actuate or control a relay or other instrument R to translate a signal or message.

The converter or transformer here shown is of the closed magnetic circuit type, the magnetic circuit comprising the central limb or core 1 (see Fig. 2, etc.) with the side limbs 2 and 3, and the end limbs 4 and 5. The core 1 may be composed of a bundle of iron wires while the limbs may be composed of laminæ of iron, the core and limbs being secured together by a bolt 6, drawing the end limbs 4 and 5 against the wires of the core 1, or the core 1 may extend through some or all of the laminæ of the end limbs 4 and 5. Upon the core or central limb 1 is disposed the winding or primary coil P which is connected in circuit with the line or cable as previously described, this winding P being suitably insulated from the core 1. The terminals of the winding P are at the binding posts 7 and 8.

Upon the limb 2 is a wrapping or sleeve of insulating material 9 upon which is disposed the secondary winding S, here shown as consisting of a plurality of coils 10 all connected in series with each other at the binding posts 11 carried upon the insulating strip 12 supported by the members 13, which surround and support the core or limb 1 and are secured to the base 14, the bobbin of the winding P being also secured to the strip 12. The converter PS is here shown as a step-down transformer, that is, the secondary S has fewer turns than the primary P.

Upon the limb 3 is a covering or sleeve of insulating material 15 upon which is wound the second primary coil *p* having one terminal at the binding post 16 and its other terminal the movable contact or rider 17, secured by the screw or fastener 18, forming an adjustable handle to the metallic block 19 having two apertures through which pass the stationary metallic rods 20 and 21, which afford means for supporting the movable contact 17 and maintaining electrical communication therewith and with the binding post 22, which is in electrical communication with the rod 20.

23 is a clamping screw for clamping the movable contact in any position to which it may be adjusted. The insulation is buffed or ground off on the top side of the coil *p*, so that the contact 17 may engage the bared wire, and thus by adjusting the contact 17 to any position along the bars 20 and 21 the number of turns in the primary *p* may be adjusted. While the windings P and S may be disposed on the same core or limb, I prefer that each be on a separate core or limb.

From the foregoing description it is apparent that I have provided a closed magnetic circuit converter having three inductively related windings, each winding on a separate core or limb, suitable for use in a duplex system where the line or cable exhibits great capacity or condenser effects. Thus, the number of turns in the primary *p* may be adjusted with great nicety and the number of turns in the secondary S may also be adjusted by connecting to suitable binding posts 11.

What I claim is:

1. The combination with the line or cable having great capacity, of a transformer having a closed magnetic circuit and comprising three windings, said windings disposed each upon a separate limb or core, one of said windings connected in said line or cable and another of said windings operating to neutralize effects in the third winding.

2. The combination with the line or cable having great capacity, of a transformer having a closed magnetic circuit and comprising a primary and secondary winding each upon a separate core or limb of the closed magnetic circuit, said primary winding connected with said line or cable, and said secondary winding controlling receiving apparatus.

3. The combination with the line or cable having great capacity, of a transformer having a closed magnetic circuit and having three windings each upon a separate limb or core, a primary winding included in circuit with the line or cable, a secondary winding in circuit with receiving apparatus, and a primary winding in a circuit controlled by transmitting means.

4. The combination with the line or cable having great capacity, of a transformer comprising three windings disposed each upon a different limb or core of a closed magnetic circuit, a primary winding of said transformer included in circuit with transmitting means, and means for adjusting the number of turns in said primary winding, and another of said windings connected in said line or cable.

5. The combination with the line or cable having great capacity, of a step-down transformer having the primary connected with said line or cable, a secondary winding included in a receiving circuit, and an adjustable primary winding included in circuit with transmitting means, said transformer windings being disposed each upon a different limb or core of a closed magnetic circuit.

6. The combination with a line or cable having great capacity, of a transformer having a closed magnetic circuit, a primary winding of said transformer connected in said line or cable, a secondary winding of said transformer included in a receiving circuit and disposed upon a limb of said magnetic circuit, a second winding upon another limb of said circuit, a slide support, and a movable contact mounted upon said slide support for adjusting the number of turns in said winding.

7. The combination with a line or cable having great capacity, of a transformer having a closed magnetic circuit, said magnetic circuit having a plurality of limbs, a primary winding included in circuit with said line or cable, a secondary winding included in circuit with receiving apparatus, and a third winding associated with transmitting apparatus, a slide support associated with said third winding, and a movable contact carried by said slide support for adjusting the number of turns in said third winding.

8. The combination with a line or cable having great capacity, of a transformer associated therewith and having a closed magnetic circuit, members for supporting said closed magnetic circuit, a winding upon each of three different limbs of said magnetic circuit, one of said windings connected with said line or cable, a second winding connected in circuit with receiving apparatus, a third winding associated with transmitting apparatus, a slide support supported by said supporting members, and a contact movable upon said slide support and adapted to vary the number of turns in said third winding.

9. In duplex telegraphy, the combination with the line, of receiving apparatus comprising a transformer having a closed magnetic circuit and whose primary is associated with said line, a receiving instrument controlled by the transformer secondary, and a third winding upon said transformer associated with the transmitting apparatus for neutralizing in the transformer secondary the effect of the transmitted impulses, said closed magnetic circuit having three limbs, one of said windings disposed upon each limb.

10. In duplex telegraphy, the combination with the line, of receiving apparatus comprising a transformer having a closed magnetic circuit and whose primary is associated with said line, a receiving instrument controlled by the transformer secondary, a third winding upon said transformer associated with the transmitting apparatus for neutralizing in the transformer secondary the effect of the transmitted impulses, said closed magnetic circuit having three limbs, one of said windings disposed upon each limb, and means for adjusting the number of turns in said third winding.

In testimony whereof I have hereunto affixed my signature in the presence of the two subscribing witnesses.

ISIDOR KITSEE.

Witnesses:
  A. E. STEINBOCK,
  ELEANOR T. McCALL.